United States Patent [19]

Questel et al.

[11] Patent Number: 4,623,413

[45] Date of Patent: Nov. 18, 1986

[54] METHOD OF PROTECTING DECORATIVE MATERIAL WITH RELEASE FILM

[75] Inventors: John M. Questel, Stow; Ralph J. Madonia, Kent, both of Ohio

[73] Assignee: Morgan Adhesives Company, Stow, Ohio

[21] Appl. No.: 690,961

[22] Filed: Jan. 14, 1985

Related U.S. Application Data

[62] Division of Ser. No. 353,625, Mar. 1, 1982, Pat. No. 4,499,130.

[51] Int. Cl.$^4$ .............................................. B32B 7/06
[52] U.S. Cl. .................................... 156/247; 156/289
[58] Field of Search ...................... 156/247, 289, 344; 264/322, 510; 455/40, 42

[56] References Cited

U.S. PATENT DOCUMENTS 3,971,866  7/1976  Johnson ............................ 264/553
4,151,319  4/1979  Sackoff et al. ....................... 428/40
4,443,283  4/1984  Sarkisian ........................... 156/247

*Primary Examiner*—Michael Ball
*Attorney, Agent, or Firm*—Oldham, Oldham & Weber, Co.

[57] ABSTRACT

A protective, easily removable laminate for application to the carpeting, and decorative seat and wall covering material of vehicles includes a plastic film coated on one surface with an acrylic resin based pressure sensitive adhesive. The film, in one form of the invention, is comprised of unoriented polypropylene capable of stretching and withstanding deep drawing and resisting the heat involved in thermoforming. The pressure sensitive adhesive is essentially of the type which does not adversely affect paint or trim material and which has preferential adhesion failure to the carpeting or seat or wall covering rather than to the film. In another form of the invention, the film, where it is not to be subjected to thermoforming operations, may be of a different composition such as polyethylene terephthalate, oriented polypropylene, polyethylene, or polyvinyl chloride. The method of employing the film in all forms of the invention is to apply the pressure sensitive adhesive to one surface of the film. The film is then applied to the carpeting or other material which can be stored and transported in roll form. By virtue of the adhesive, the film adheres to the carpet or other material until physically removed therefrom. The method further includes cutting the material into squares, die cutting it, and punching holes where required. The laminate of the material and the film is then installed in the vehicle and upon delivery of the finished vehicle to the dealer, the film can thus be removed. In some instances the material is also thermoformed prior to die cutting.

6 Claims, No Drawings

METHOD OF PROTECTING DECORATIVE MATERIAL WITH RELEASE FILM

CROSS REFERENCE

This is a divisional application of application Ser. No. 353,625, filed Mar. 1, 1982, now U.S. Pat. No. 4,499,130, patented Feb. 12, 1985.

FIELD OF THE INVENTION

This invention, in general, relates to protective laminates and relates in particular to a laminate of this general type for use in the automotive industry to protect carpeting, seat cover material, wall cover material, or headliner material during fabrication of the vehicle.

DESCRIPTION OF THE PRIOR ART

It is well known that most automotive vehicles, including automobiles and trucks, have interior textile or decorative plastic panels as well as carpeting. These coverings are installed in an early stage in the production process. Therefore, it has been found that the employees who fabricate the vehicles must come in contact with these decorative materials as they assemble other parts of the vehicle. During this downstream assembly, the fabricators will frequently soil the interior of the vehicle with their shoes, hands, body, clothes, or tools. It has also been found that the assembled vehicle may also become soiled during its transportation from the assembly point to the dealer and thus to the ultimate consumer.

Naturally, this is undesirable and generally requires the use of protective means which will now be described in order to avoid the expense of thoroughly cleaning the vehicle interior prior to presentation to the retail customer.

The prior art known to Applicant for prohibiting this defacing or soiling of the decorative interior material involves various attempts at covering the decorative material during the fabrication operation. For example, plastic bags have been placed over the seats and cardboard has been placed on the floor of the vehicles. Plastic film, such as polyethylene, for example, has also been used and affixed to the carpet and other parts of the vehicle by metallic staples. Applicant is also aware of the attachment of fiber-reinforced plastic films to the carpet or other material by plastic devices much like rivets.

While the above noted prior art methods do give some degree of protection to the decorative material, they present problems as well. For one thing, these methods are relatively costly. They are, of course, labor intensive since they often require stapling or riveting or somehow affixing the protective covering to the material to be protected. They also require application at the assembly point after installation of the protected material in the vehicle which presents yet another opportunity for soiling.

These methods also are not wholly satisfactory because they do not generally present a protective covering which is securely affixed to the material being protected, and which conforms to the configurations thereof so as to thoroughly protect all of the surface which might be exposed to soiling.

Furthermore, the present methods employ protective means which are not necessarily securely attached to the material being protected so that to some extent it is possible for soil to enter the space between the protective covering and the material being protected.

Additionally, since the methods of securing the protective material to the protected material are somewhat less than satisfactory, these protective materials are really rather loosely attached and slippery in nature so that the workers have a tendency to slip and fall while working in the interior of the vehicle.

It is accordingly the principal object of this invention to introduce a new concept for protecting the interior of automotive vehicles. It should be noted, however, that the concept involved here is not necessarily limited to use on any particular automotive vehicle.

BRIEF DESCRIPTION OF THE INVENTION

The present invention primarily involves coating a flexible plastic film, such as unoriented polypropylene, with an acrylic resin based pressure sensitive adhesive. The film thus coated is then laminated to the carpeting or other textile or plastic material which is intended to be used in the interior of the vehicle while still in roll form such carpeting or other material is hereinafter usually referred to as "applied material".

Of course, by virtue of the presence of the adhesive, the film adheres to the carpet or other material during subsequent operations in fabricating the vehicle as well as during transportation and installation of the protected material itself.

It has been found that utilization of a film of this type with an adhesive of this type permits a complete covering of the material which is intended to be protected and presents a covering which will securely adhere to the material until it is physically removed, thereby avoiding any inadvertent or accidental dislodgement of the material.

It has also been found that where the material to be protected is to be subjected to thermoforming operations in the fabrication process, that the film is preferably of unoriented polypropylene. This enables it to stretch and withstand the deep drawing which occurs as the material is thermoformed into the contours of the floor of the vehicle.

It has been found in another version of the invention, however, that in certain applications where the material is not to be subjected to thermoforming, that other plastic films can be substituted with equally satisfactory results. Examples of these films would be biaxially oriented polyethylene terephthalate, oriented polypropylene, polyethylene, or polyvinyl chloride.

Accordingly, production of an improved protective laminate and method of applying the same becomes the principal object of this invention with other objects thereof becoming more apparent upon a reading of the following brief specification.

DESCRIPTION OF THE PREFERRED EMBODIMENTS

Considering first the application of the protective material to material which is to be subjected to a thermoforming operation, it has been found that the desired protection can be achieved by providing a plastic film material preferably of unoriented polypropylene having a thickness of from 0.001 to 0.002 inches. Film within this range performs satisfactorily for this application with perhaps the most desired thickness being 0.00125 inches. However, it should be understood that somewhat thinner or somewhat thicker film may also perform satisfactorily.

As noted, the plastic film is preferably, in this embodiment of the invention, unoriented polypropylene. This is so that the film may readily stretch and withstand the deep drawing which occurs as the carpet or other material is thermoformed into the contours of the vehicle.

One surface of the film is coated with a layer of pressure sensitive adhesive, preferably an acrylic resin based pressure sensitive adhesive.

The adhesive is, of course, important to the effectiveness of the invention. It is necessary that it has sufficient tack and tear strength to adhere to the material being protected. However, it also must preferentially adhere to the film when peeled from the carpet so as to not cause any deleterious effects ("offsetting") to the applied material. It also must be compounded so that it is compatible and will not adversely effect any contacting paint or trim material or show any objectional discoloration or degradation after being in contact with the protected material.

An example of a pressure sensitive adhesive of the type referred to herein is produced by Union 76, Union Chemicals Division, and identified as AMSCO-PSA ® 9201.

This adhesive has the following physical properties:

| Form | Aqueous Emulsion |
| --- | --- |
| Base | Acrylic |
| Solids | 65% |
| Viscosity (Brookfield, RVF @ 25° C.) | 2000 cps |
| pH | 4.5 |
| Weight/Gallon | 8.4 lbs. |
| Odor | Mild |

The following Table shows some typical performance data for this adhesive:

| TEST | TEST METHOD | RESULTS |
| --- | --- | --- |
| 180° Peel | PSTC-1 (30 min. dwell) | 1.8 lbs./in. |
| 90° Quick Stick | PSTC-5 | 1.0 lbs./in. |
| 0° Shear | PSTC-7 ($\frac{1}{2}"\times\frac{1}{2}"\times 500$ g.) | 3.0 hours |

It will be understood that this adhesive is specified by way of example only and that other adhesives having comparable properties could also be employed.

Once the pressure sensitive adhesive has been applied to the film by conventional methods such as reverse roll, gravure, Meyer bar, knife-over-roll, etc., the method of employing the protective laminate thus formed is as follows.

The laminate, consisting of the film and the pressure sensitive adhesive, is in turn laminated to the carpeting or other material intended to be protected while still in roll form. The film, of course will adhere, by virtue of the adhesive, to the protected material and the material will be protected throughout its further handling during transportation and fabrication of the vehicle.

Typically, and considering initially carpeting for the floor of the vehicle, the carpet will then be cut into squares; thermoformed to conform to the contours of the floor of the vehicle; die cut; and punched with the various holes to receive various components of the vehicle. The laminate remains securely in contact with the carpet during all of these steps which normally would be performed at the plant of the carpet manufacturer.

Following this operation, the laminate, which now consists of the carpet, the film, and the adhesive, is shipped to the vehicle assembly plant where it is installed into the vehicle. Naturally, as noted above, many operations are performed on the vehicle at the assembly plant after installation of the carpet laminate. However, the film, by virtue of its characteristics and the characteristics of the adhesive, will firmly adhere the protective laminate to the protected material, i.e., the carpet in this case, and will resist accidental dislodgement and will protect the carpet from any inadvertent soiling or other damage.

Upon delivery of the finished vehicle to the dealer, the employees of the dealer can then remove the film by simply peeling it off, thus presenting a clean surface to the ultimate purchaser. In this regard, it might be noted that an added advantage of the present invention is that when the laminate is removed, the adhesive will take with it any loose lint or dirt which might have been on the surface of the carpet.

Also, the present invention has been found to have utility in the application of heel pad material to the carpeting.

In this regard, it is common to provide reinforcing material to selected areas of the carpeting, such as adjacent the accelerator pedal where rotation of the driver's heel causes excessive wear.

Conventionally, heel pads or other items of this nature are made of material such as polyvinyl chloride and are bonded to the carpet using pressure plus radio frequency or microwave energy which softens the compound which is then pressed into the carpet with a pattern being embossed therein simultaneously.

With the present invention, this operation can be carried out over the protective film which will not interfere with the bonding process. This avoids having to die cut the film and permits the film to be applied to the protective material in roll form even when the later addition of items, such as a heel pad, are contemplated.

In a modified form of the invention where thermoforming and drawing are not necessary, such as, for example, perhaps in the side panels or wall panels, other types of film rather than the unoriented polypropylene can be utilized. These films are not subjected to the stretching and the elevated temperatures involved in the thermoforming operation. Examples of films which will work satisfactorily in this application are biaxially oriented polyethylene terephthalate, oriented polypropylene, polyethylene, or polyvinyl chloride film. These films, of course, would also be coated with a pressure sensitive adhesive having the characteristics above described and essentially the method of utilizing the protective laminate would be identical with that already described, except, of course, that the thermoforming step would not be required.

In either form of the invention, however, the protective laminate is securely and thoroughly placed in position to cover the exposed surface of the protected material. The laminate is such that it will not in itself cause any damage to the material being protected or any of the trim or accessory material associated therewith but will adequately cover and protect the protected material.

While a full and complete description of the invention has been set forth in accordance with the dictates of the Patent Statutes, it should be understood that modifications can be resorted to without departing from the spirit hereof or the scope of the appended claims.

Thus, it has also been found that in some applications, depending on the nature of the material being protected, it may be necessary to utilize additional curing agents with the adhesive to increase the polymerization and to enhance the resistance to offsetting. One example of such cross linking agents is melamine formaldehyde resins and urea formaldehyde resins. Another example is magnesium acetate or zinc acetate. Glyoxals may be also used. These agents may be used in concentrations between 0.250% and 5%, by weight, depending upon the nature of agent.

What is claimed is:

1. A method of protecting applied material such as carpeting and decorative material for vehicles comprising the steps of:
    (A) coating one surface of plastic film with a cross-linked acrylic, resin based pressure sensitive adhesive which resists adhesive transfer to the applied material;
    (B) applying said film to a decorative face of the applied material;
    (C) cutting and thermoforming the applied material to its final configuration;
    (D) installing the applied material in the vehicle to leave the plastic film exposed;
    (E) completing fabrications of the vehicle; and
    (F) removing the film.

2. The method of claim 1 wherein
    (A) the film is unoriented polypropylene.

3. The method of claim 2 wherein
    (A) reinforcing material is applied to selected areas of the applied material over the film.

4. A method of protecting applied material such as carpeting and decorative material for vehicles comprising the steps of:
    (a) coating one surface of plastic film with a cross-linked acrylic, resin based pressure sensitive adhesive which resists adhesive transfer to the applied material;
    (b) applying said coated surface of said film to the applied material;
    (c) cutting and thermoforming the laminate formed of said film and the applied material to its final configuration;
    (d) installing said laminate of film and said applied material in the vehicle;
    (e) completing the fabrication of the vehicle; and
    (f) subsequently removing the film from the installed laminate.

5. The method of claim 1 wherein step (c) includes thermoforming the laminate formed of said film and the applied material; and
    the film is unoriented polypropylene.

6. The method of claim 4 wherein
    reinforcing material is applied to selected areas of the applied material over the film thereon.

* * * * *